(12) United States Patent
Lee et al.

(10) Patent No.: US 8,801,088 B2
(45) Date of Patent: Aug. 12, 2014

(54) FRONT VEHICLE BODY REINFORCING STRUCTURE

(71) Applicant: Hundai Motor Company, Seoul (KR)

(72) Inventors: Kyunghee Lee, Whasung-Si (KR); Yong Kew Kim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/734,307

(22) Filed: Jan. 4, 2013

(65) Prior Publication Data

US 2014/0049074 A1 Feb. 20, 2014

(30) Foreign Application Priority Data

Aug. 20, 2012 (KR) .................. 10-2012-0090924

(51) Int. Cl.
*B62D 25/08* (2006.01)
(52) U.S. Cl.
USPC .............. 296/203.02; 296/193.09; 296/198; 296/30
(58) Field of Classification Search
USPC .......... 296/187.09, 193.09, 203.02, 198, 192, 296/203.01, 29, 30; 280/124.147, 124.155
See application file for complete search history.

(56) References Cited

U.S. PATENT DOCUMENTS

| 4,919,474 | A   | * | 4/1990  | Adachi et al. ......... 296/203.02 |
|-----------|-----|---|---------|------------------------------------|
| 6,332,642 | B1  | * | 12/2001 | Hanyu .................. 296/203.02 |
| 6,773,057 | B2  | * | 8/2004  | Nomura ...................... 296/198 |
| 7,147,275 | B2  | * | 12/2006 | Matsuyama et al. ..... 296/203.02 |
| 7,703,805 | B2  | * | 4/2010  | Sasaki et al. .................. 280/784 |
| 7,828,330 | B2  | * | 11/2010 | Tamura et al. ................ 280/788 |
| 7,845,716 | B2  | * | 12/2010 | Kiyotake et al. ......... 296/203.02 |
| 8,459,728 | B2  | * | 6/2013  | Fujii et al. ................. 296/203.02 |
| 8,528,966 | B2  | * | 9/2013  | Kim ........................... 296/198 |
| 8,590,663 | B2  | * | 11/2013 | Mildner et al. .............. 180/312 |
| 2006/0006699 | A1 | * | 1/2006  | Matsuyama et al. ..... 296/203.02 |

FOREIGN PATENT DOCUMENTS

| JP | 64-22684 U   |   | 2/1989  |
|----|--------------|---|---------|
| JP | 2-189287     | * | 7/1990  |
| JP | 5-238420 A   |   | 9/1993  |
| JP | 6-255532 A   |   | 9/1994  |
| JP | 2001-278116 A |  | 10/2001 |
| JP | 2003-19978 A |   | 1/2003  |

* cited by examiner

*Primary Examiner* — Glenn Dayoan
*Assistant Examiner* — Gregory Blankenship
(74) *Attorney, Agent, or Firm* — Morgan, Lewis & Bockius LLP

(57) ABSTRACT

A front vehicle body reinforcing structure includes: an upper reinforcing member and a lower reinforcing member attached to an upper portion and a lower portion of the shock absorber housing panel; and a front reinforcing rail and a rear reinforcing rail attached to a front side and a rear side of the shock absorber housing panel in a longitudinal direction of the vehicle, respectively, thereby enhancing strength of a front vehicle body.

12 Claims, 6 Drawing Sheets

FRONT VEHICLE BODY REINFORCING STRUCTURE

CROSS-REFERENCE TO RELATED APPLICATION

The present application claims priority to Korean Patent Application No. 10-2012-0090924 filed on Aug. 20, 2012, the entire contents of which is incorporated herein for all purposes by this reference.

BACKGROUND OF THE INVENTION

1. Field of the Invention

The present invention relates to a front vehicle body reinforcing structure in which strength of a mounting portion at which a front strut constituting a suspension system of a vehicle is mounted to a vehicle body and strength around the mounting portion is enhanced.

2. Description of Related Art

A strut type of suspension system in the related art includes a strut including a shock absorber therein and is installed between wheels and a vehicle body.

That is, an upper portion of the strut is mounted to a wheel housing provided at a fender apron constituting a front vehicle body, and a lower portion of the strut is mounted to a suspension arm connected to the wheels to be supported.

Strength of a portion in which the strut is mounted to the vehicle body, that is, vehicle body mounting point strength, and strength around the portion acts as an important factor for ride comfort, operation stability, noise and vibration performance, and crash stability of a vehicle, so that it is necessary to enhance strength of the vehicle body mounting point strength and strength around the vehicle body mounting point.

Further, because a bottom of the vehicle body has been recently lowered for securing a wide interior space, it is necessary to secure appropriate strength of a downward mounting structure of the strut.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a front vehicle body reinforcing structure having advantages of improving ride comfort, operation stability, and noise and vibration performance of a vehicle by enhancing vehicle body mounting point strength of a front strut installed between front wheels and a vehicle body, improving crash stability of a vehicle by decreasing a quantity of deformation and a quantity of skid of the vehicle body when a front crash accident of a vehicle is generated by enhancing strength around the mounting point, and securing strength necessary when the strut is mounted downwardly according to the lowering of the bottom of the vehicle body.

In an aspect of the present invention, a front vehicle body reinforcing structure, may include a shock absorber housing panel may include d in a fender apron, an upper reinforcing member and a lower reinforcing member attached to an upper portion and a lower portion of the shock absorber housing panel, and a front reinforcing rail and a rear reinforcing rail attached to a front side and a rear side of the shock absorber housing panel in a longitudinal direction of the vehicle, respectively.

A side member extending in the longitudinal direction of the vehicle is connected to a lower portion of the fender apron, wherein an engine mounting bracket is attached to the fender apron, the side member, and the front reinforcing rail so as to form a closed cross section.

The engine mounting bracket is shaped like a box of which three surfaces may have openings, wherein a flange is formed along an edge of the openings, wherein the flange is attached to each of the fender apron and the side member, and wherein the engine mounting bracket is attached to the front reinforcing rail while partially overlapping the front reinforcing rail.

The fender apron may include an upper member extending in the longitudinal direction of the vehicle, wherein the shock absorber housing panel may include a strut mounting portion to which an upper portion of a suspension strut is mounted, and an extending portion slantly extending in an upper direction from the strut mounting portion to be connected to the upper member of the fender apron.

The upper reinforcing member may include a cross section shaped like "┐", and a flange formed along an edge of the cross section, wherein the flange of the upper reinforcing member is attached to each of the upper member of the fender apron and the extending portion of the shock absorber housing panel to form the closed section shaped like a quadrangle by the upper reinforcing member, the upper member, and the extending portion.

The strut mounting portion may include a vertically extending vertical surface, wherein the lower reinforcing member may include a first lower reinforcing member attached to an upper portion of the vertical surface of the strut mounting portion, and a second lower reinforcing member inserted inside a closed section formed by the side member while being attached to a lower portion of the vertical surface.

The first lower reinforcing member and the second reinforcing member may include a flange attached to the vertical surface, wherein a closed section is formed between the first lower reinforcing member and the vertical surface, and a closed section is formed between the second lower reinforcing member and the vertical surface.

The front reinforcing rail may include a section including one opened surface, and a flange formed along an edge of the section, wherein the flange of the front reinforcing is attached to the fender apron while the one opened surface faces the fender apron so that a closed section is formed between the front reinforcing rail and the fender apron.

A dash cross member extending in a traverse direction of the vehicle is attached to the fender apron, wherein the rear reinforcing rail may include a section generally shaped like "L" in which two surfaces are opened and a flange formed along an edge of the section and wherein the flange of the rear reinforcing rail is attached to the fender apron and the dash cross member while the opened two surfaces face the fender apron and the dash cross member, respectively, so that a closed section is formed by the rear reinforcing rail, the fender apron, and the dash cross member.

The extending portion of the shock absorber housing panel is formed while continuing in a vertical direction and may include two rails concavely formed toward an engine room, wherein the two rails are connected by a protrusion protruding toward the engine room.

A cowl extending in the traverse direction of the vehicle is connected to a rear side of the fender apron, wherein the cowl may include a cowl inner lower side reinforce, and wherein the cowl inner lower side reinforce is attached to the rear reinforcing rail while covering an upper portion of the rear reinforcing rail so that a closed section is formed between the cowl inner lower side reinforce and the rear reinforcing rail.

The cowl inner lower side reinforce is attached to the cowl and the upper member of the fender apron, wherein a cowl reinforce bent downwardly is attached to the cowl inner lower side reinforce, wherein the cowl reinforce is attached to the rear reinforcing rail, and wherein the rear reinforcing rail is attached to the upper member of the fender apron and the dash cross member so that a closed section is formed by an upper surface of the rear reinforcing rail, the cowl reinforce, and the cowl inner lower side reinforce, and a closed section is formed on the closed section by the cowl, the cowl inner lower side reinforce, and the upper member of the fender apron.

According to the exemplary embodiment of the present invention, the upper reinforcing member, the lower reinforcing member, the front reinforcing rail, and the rear reinforcing rail are arranged in the shock absorber housing panel included in the fender apron and around the shock absorber housing panel, so that strength of the shock absorber housing panel itself and strength around the shock absorber housing panel is effectively increased, thereby enhancing vehicle body mounting point strength of the shock absorber.

Further, the rear reinforcing rail is connected to the dash cross member and the cowl to increase distortion strength of the vehicle body, and the front reinforcing rail and the rear reinforcing rail connect the fender apron and the side member, thereby increasing front vehicle body strength.

Multiple sections are formed by the rear reinforcing rail, the cowl, and the reinforce of the cowl, so that connectivity enhancement and a load distribution effect are achieved, thereby reducing a quantity of deformation of the front vehicle body and a quantity of skid in a front crash of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
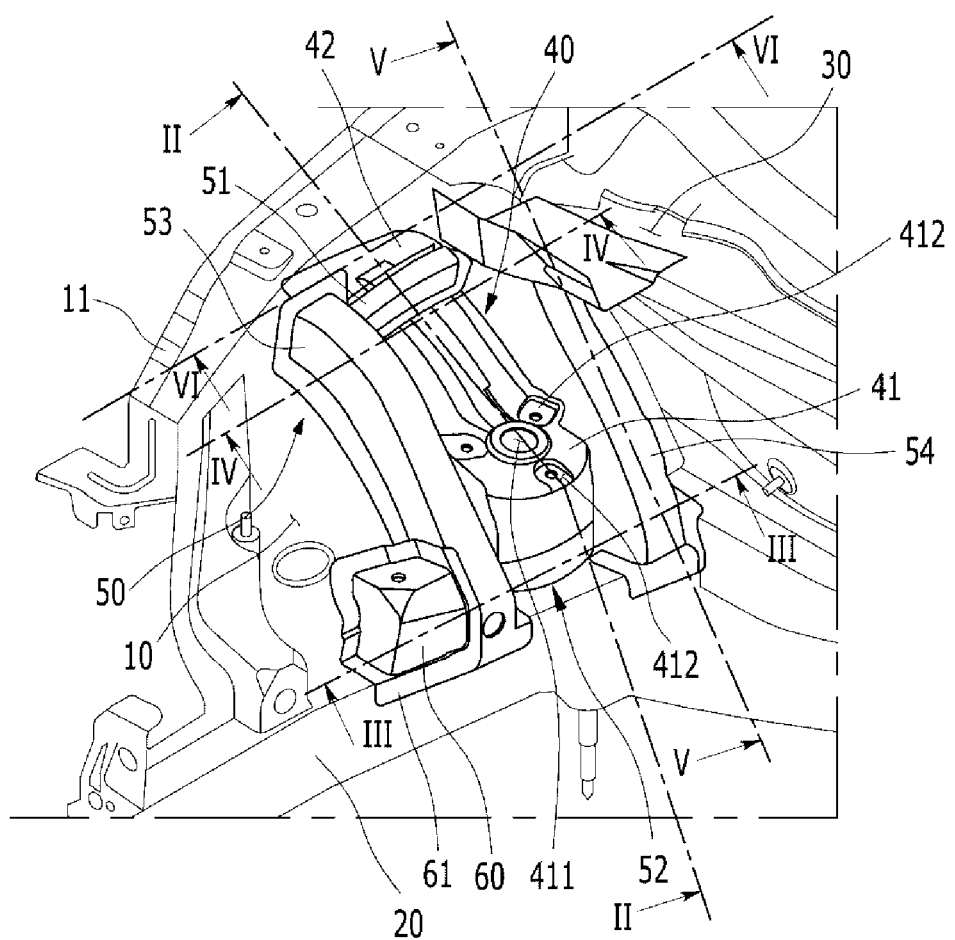
FIG. 1 is a perspective view of a state in which a reinforcing unit according to an exemplary embodiment of the present invention is mounted to a front vehicle body.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described with reference to the accompanying drawings.

Referring to FIG. 1, a fender apron 10 is disposed on an upper portion of a vehicle in a height direction of the vehicle, a side member 20 extending in a longitudinal direction of the vehicle is disposed in a lower portion of the fender apron 10, and a cowl 30 extending in a traverse direction of the vehicle is disposed in a rear portion of the fender apron 10, so that a front vehicle body is partially constituted.

The fender apron 10 includes a shock absorber housing panel 40 for mounting a suspension strut of the vehicle.

A reinforcing unit 50 according to an exemplary embodiment of the present invention is disposed in and around the shock absorber housing panel 40, to enhance strength.

The reinforcing unit 50 includes an upper reinforcing members 51 and a lower reinforcing member 52 disposed while being attached to an upper portion and a lower portion of the shock absorber housing panel 40 in the height direction of the vehicle, respectively, and a front reinforcing rail 33 and a rear reinforcing rail 34 disposed in a front portion and a rear portion of the shock absorber housing panel 40 according to the longitudinal direction of the vehicle, respectively.

An engine mounting bracket 60 for mounting and supporting an engine is attached to a lower end portion of the front reinforcing rail 53 and the side member 20 adjacent to the lower end of the front reinforcing rail 53.

The engine mounting bracket 60 is shaped like a box of which three surfaces include openings, and a flange 61 is formed along edges of the openings so that the flange 61 is attached to the fender apron 10, the side member 20, and the front reinforcing rail 53.

Accordingly, the openings of the three surfaces of the engine mounting bracket 60 are covered by the fender apron 10, the side member 20, and the front reinforcing rail 53, so that a sealed closed cross section is formed between the engine mounting bracket 60 and the fender apron 10 and between the side member 20 and the front reinforcing rail 53.

Accordingly, mounting strength of the engine mounting bracket 60 is improved and the engine may be more stably supported.

The shock absorber housing panel 40 includes a strut mounting portion 41 to which an upper portion of the suspension strut is mounted, and an extending portion 42 slantly extending in an upper direction from the strut mounting portion to be connected to an upper member 11 of the fender apron.

The strut mounting portion 41 includes a coupling hole 411 through which an upper end of the suspension strut passes to be coupled with the coupling hole 411, and a plurality of bolt fastening holes 412 formed around the coupling hole 411 so that the upper portion of the suspension strut is mounted with bolts and nuts.

Figure 2:
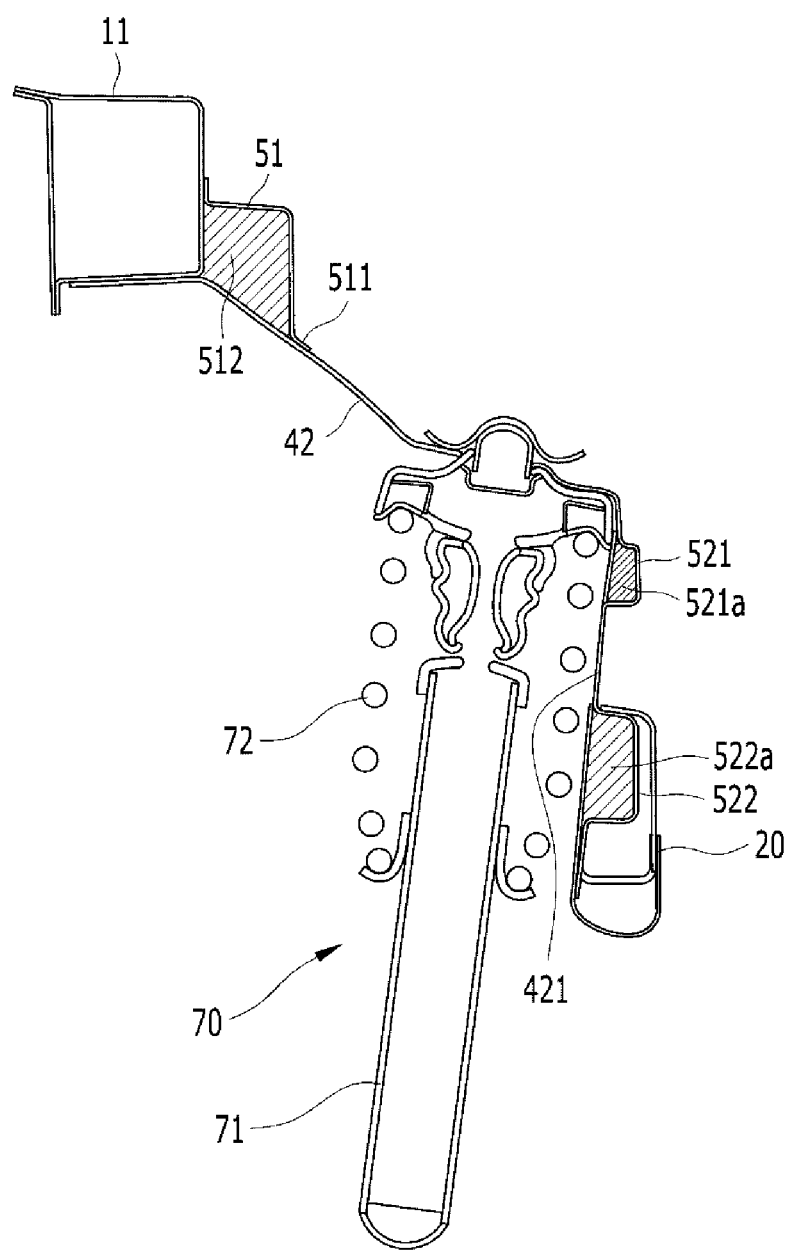
FIG. 2 is a cross-sectional view taken along line II-II of FIG. 1.

Referring to FIG. 2, the suspension strut 70 includes a shock absorber 71 for absorbing and buffering vibration and shock and a suspension spring 72 mounted while being fitted to an outer circumference of the shock absorber 71, and the upper end of the shock absorber 71 is inserted in the coupling hole 411 of the strut mounting portion 42 of the shock absorber housing panel 40 to be coupled.

The upper reinforcing member 51 includes a cross section generally shaped like "⌐" and a flange 511 formed along an edge of the cross section, and is attached to each of the upper member 11 of the fender apron 10 and the extending portion 42 of the shock absorber housing panel 40.

A closed section 512 generally shaped like a quadrangle is formed by the upper reinforcing member 51, the upper member 11, and the extending portion 42, so that connection strength between the fencer apron 10 and the shock absorber housing panel 40 is enhanced.

The strut mounting portion 42 includes a vertical surface 421 extending in a vertical direction.

The lower reinforcing member 52 includes a first lower reinforcing member 521 attached to an upper portion of the vertical surface 421 of the strut mounting portion 42 and a second lower reinforcing member 522 attached to a lower portion of the vertical surface 421 and inserted inside the closed cross section formed by the side member 20.

Each of the first lower reinforcing member 521 and the second lower reinforcing member 522 has one surface of an opened cross section, a flange is formed along an edge of the opened cross section, and the flange is attached to the vertical surface 421 in a state where the opened surface faces the vertical surface 421.

A closed section 521a is formed between the first lower reinforcing member 521 and the vertical surface 421 and a closed section 522a is also formed between the second lower reinforcing member 522 and the vertical surface 421.

Accordingly, strength of the shock absorber housing panel 40 itself is enhanced, and connection strength between the side member 20 and the shock absorber housing panel 40 is also enhanced.

Figure 3:
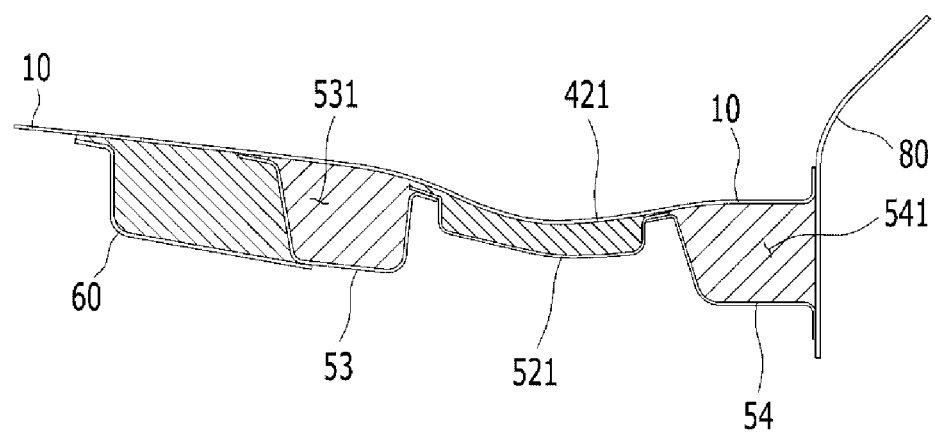
FIG. 3 is a cross-sectional view taken along line III-III of FIG. 1.

Referring to FIG. 3, the front reinforcing rail 53 has one surface of an opened cross section, a flange is formed along an edge of the cross section, and the flange is attached to the fender apron 10 while facing the fender apron 10, so that a closed section 531 is formed between the front reinforcing rail 53 and the fender apron 10.

A part of the engine mounting bracket 60 is attached to the front reinforcing rail 53 while partially overlapping the front reinforcing rail 53.

A dash cross member 80 extending in a traverse direction of the vehicle is attached to the fender apron 10.

The rear reinforcing rail 54 has a cross section generally shaped like "L", in which two surfaces are opened, a flange is formed along an edge of the cross section, and the flange is attached to the fender apron 10 and the dash cross member 80 in a state where the two opened surfaces face the fender apron 10 and the dash cross member 80, respectively.

Accordingly, the closed cross section 541 is formed by the rear reinforcing rail 54, the fender apron, and the dash cross member 80, so that connection strength between the fender apron 10 and the dash cross member 80 is enhanced.

The first lower reinforcing rail 521 is interposed between the front reinforcing rail 53 and the rear reinforcing rail 54, the flanges at both sides of the first lower reinforcing rail 521 are interposed between the flange of the front reinforcing rail and the fender apron and between the flange of the rear reinforcing rail and the fender apron, respectively, to be simultaneously attached to the fender apron.

Figure 4:
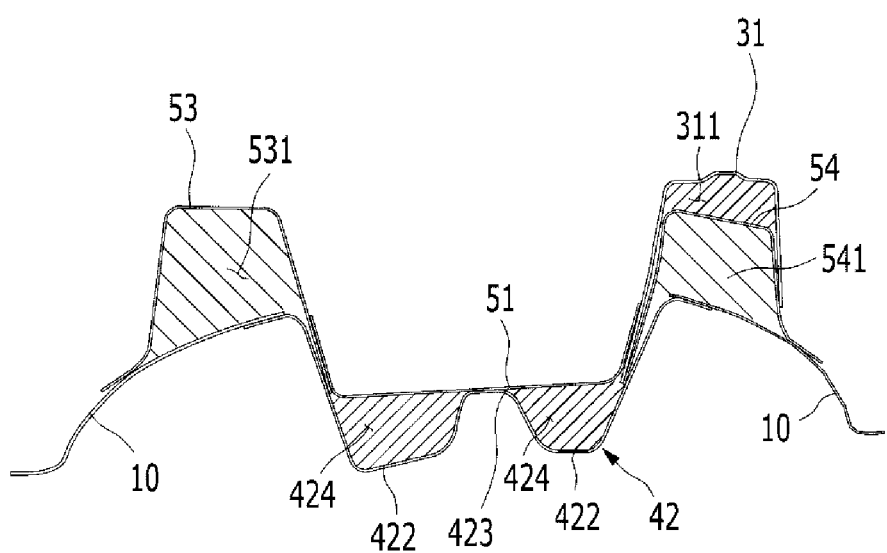
FIG. 4 a cross-sectional view taken along line IV-IV of FIG. 1.

Referring to FIG. 4, the extending portion 42 of the shock absorber housing panel 40 is continued in a vertical direction and includes two concave rails 422 opened toward an engine room.

The two rails 422 are arranged in front and rear portions in the longitudinal direction of the vehicle, a protrusion 423 protruding toward the engine room is integrally connected between the two rails 422, and the upper reinforcing member 51 is integrally attached to the protrusion 423 through the flange while being seated on the protrusion 423.

A concave cross section 424 is formed at the shock absorber housing panel by the respective rails 422.

Accordingly, a load applied to the shock absorber housing panel 40 is effectively distributed to the upper fender apron 10 and the lower side member 20 by the two vertically extending cross sections 424 formed by the two rails 422, a vertically extending closed cross section 531 formed by the two front reinforcing rails 53, and a vertically extending closed cross section 541 formed by the rear reinforcing rail 54, thereby enhancing the mounting point strength.

A cowl inner lower side reinforce 31 is attached to an upper portion of the rear reinforcing rail 54 while covering the upper portion of the rear reinforcing rail 54, so that a closed section 311 is formed between the cowl inner lower side reinforce 31 and the rear reinforcing rail 54.

Further, the respective flanges formed while facing the front reinforcing rail 53 and the rear reinforcing rail 54, respectively, are interposed between the flange of the upper reinforcing member 51 and an inclined surface of the extending portion 42, to be simultaneously attached.

Figure 5:
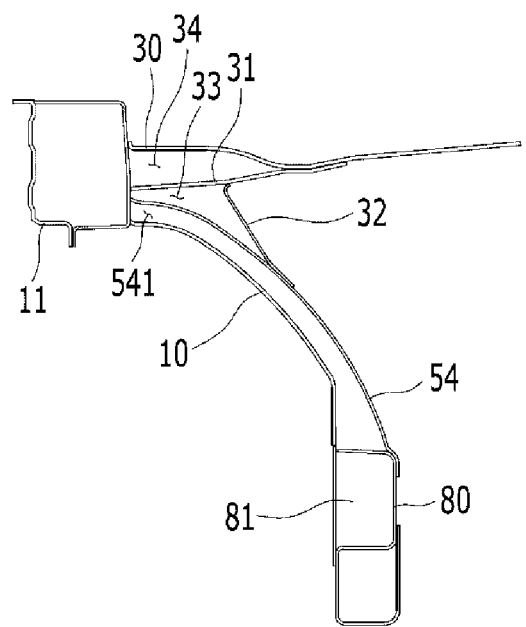
FIG. 5 a cross-sectional view taken along line V-V of FIG. 1.
Figure 6:
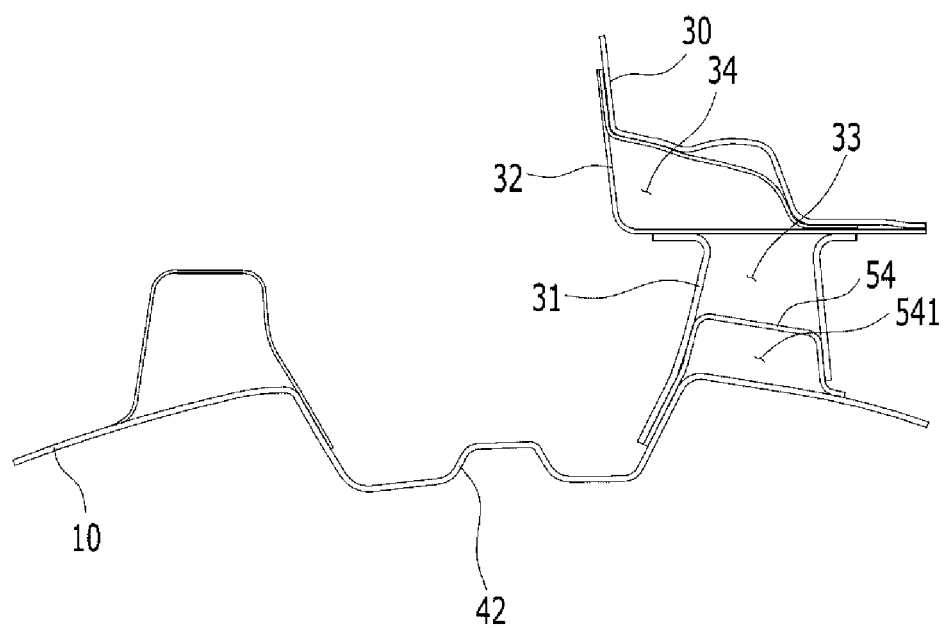
FIG. 6 a cross-sectional view taken along line VI-VI of FIG. 1.

Referring to FIGS. 5 and 6, the cowl inner lower side reinforce 31 is attached to the cowl 30 and the upper member 11 of the fender apron, a coal reinforce 32 bent downwardly is attached to the cowl inner lower side reinforce 31, and the cowl reinforce 32 is attached to the rear reinforcing rail 54.

Further, the rear reinforcing rail 54 is attached to each of the upper member 11 of the fender apron and the dash cross member 80.

Accordingly, the closed cross section 541 formed between the rear reinforcing rail 54 and the fender apron 10 is connected with the closed cross section 81 formed by the dash cross member 80.

A closed section 33 is formed on the closed cross section 541 by the upper surface of the rear reinforcing rail 54, the cowl reinforce 32, and the cowl inner lower side reinforce 31.

A closed section 34 is formed on the closed cross section 33 by each of the cowl 30, the cowl inner lower side reinforce 31, and the upper member 11 of the fender apron, so that a structure of the triple closed cross sections 541 33, and 34 is included.

Accordingly, the dash cross member 80 is connected to the closed cross section 541 of the rear reinforcing rail 54 so that connection strength is enhanced, and a bottom surface of the cowl 30 is connected to the upper portion of the rear reinforcing rail 54 and the closed cross sections 33 and 34, so that connection strength is enhanced.

Further, the rear reinforcing rail 54 integrally connects the dash cross member 80 and the cowl 30, so distortion strength of the front vehicle body is enhanced.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A front vehicle body reinforcing structure, comprising:
a shock absorber housing panel included in a fender apron;
an upper reinforcing member and a lower reinforcing member attached to an upper portion and a lower portion of the shock absorber housing panel; and
a front reinforcing rail and a rear reinforcing rail attached to a front side and a rear side of the shock absorber housing panel in a longitudinal direction of the vehicle, respectively;
wherein full bodies of the upper reinforcing member and the lower reinforcing member are disposed between the front reinforcing rail and the rear reinforcing rail.

2. The front vehicle body reinforcing structure of claim 1, wherein the front reinforcing rail includes a section including one opened surface, and a flange formed along an edge of the section, and
wherein the flange of the front reinforcing rail is attached to the fender apron while the one opened surface faces the fender apron so that a closed section is formed between the front reinforcing rail and the fender apron.

3. A front vehicle body reinforcing structure, comprising:
a shock absorber housing panel included in a fender apron;
an upper reinforcing member and a lower reinforcing member attached to an upper portion and a lower portion of the shock absorber housing panel; and
a front reinforcing rail and a rear reinforcing rail attached to a front side and a rear side of the shock absorber housing panel in a longitudinal direction of the vehicle, respectively;
wherein a side member extending in the longitudinal direction of the vehicle is connected to a lower portion of the fender apron, and
wherein an engine mounting bracket is attached to the fender apron, the side member, and the front reinforcing rail so as to form a closed cross section.

4. The front vehicle body reinforcing structure of claim 3, wherein the engine mounting bracket is shaped like a box of which three surfaces have openings,
wherein a flange is formed along an edge of the openings,
wherein the flange is attached to each of the fender apron and the side member, and
wherein the engine mounting bracket is attached to the front reinforcing rail while partially overlapping the front reinforcing rail.

5. A front vehicle body reinforcing structure, comprising:
a shock absorber housing panel included in a fender apron;
an upper reinforcing member and a lower reinforcing member attached to an upper portion and a lower portion of the shock absorber housing panel; and
a front reinforcing rail and a rear reinforcing rail attached to a front side and a rear side of the shock absorber housing panel in a longitudinal direction of the vehicle, respectively;
wherein the fender apron includes an upper member extending in the longitudinal direction of the vehicle, and
wherein the shock absorber housing panel includes:
a strut mounting portion to which an upper portion of a suspension strut is mounted; and
an extending portion slantly extending in an upper direction from the strut mounting portion to be connected to the upper member of the fender apron.

6. The front vehicle body reinforcing structure of claim 5, wherein the upper reinforcing member includes a cross section shaped like "⌐", and a flange formed along an edge of the cross section, and
wherein the flange of the upper reinforcing member is attached to each of the upper member of the fender apron and the extending portion of the shock absorber housing panel to form the closed section shaped like a quadrangle by the upper reinforcing member, the upper member, and the extending portion.

7. The front vehicle body reinforcing structure of claim 5, wherein the strut mounting portion includes a vertically extending vertical surface, and
wherein the lower reinforcing member includes:
a first lower reinforcing member attached to an upper portion of the vertical surface of the strut mounting portion; and
a second lower reinforcing member inserted inside a closed section formed by the side member while being attached to a lower portion of the vertical surface.

8. The front vehicle body reinforcing structure of claim 7, wherein the first lower reinforcing member and the second reinforcing member include a flange attached to the vertical surface, and
wherein a closed section is formed between the first lower reinforcing member and the vertical surface, and a closed section is formed between the second lower reinforcing member and the vertical surface.

9. The front vehicle body reinforcing structure of claim 5, wherein a dash cross member extending in a traverse direction of the vehicle is attached to the fender apron,
wherein the rear reinforcing rail includes a section generally shaped like "L" in which two surfaces are opened and a flange formed along an edge of the section and
wherein the flange of the rear reinforcing rail is attached to the fender apron and the dash cross member while the opened two surfaces face the fender apron and the dash cross member, respectively, so that a closed section is formed by the rear reinforcing rail, the fender apron, and the dash cross member.

10. The front vehicle body reinforcing structure of claim 5, wherein the extending portion of the shock absorber housing panel is formed while continuing in a vertical direction and includes two rails concavely formed toward an engine room, and
wherein the two rails are connected by a protrusion protruding toward the engine room.

11. The front vehicle body reinforcing structure of claim 9, wherein a cowl extending in the traverse direction of the vehicle is connected to a rear side of the fender apron,
wherein the cowl includes a cowl inner lower side reinforce, and wherein the cowl inner lower side reinforce is attached to the rear reinforcing rail while covering an upper portion of the rear reinforcing rail so that a closed section is formed between the cowl inner lower side reinforce and the rear reinforcing rail.

12. The front vehicle body reinforcing structure of claim 11, wherein the cowl inner lower side reinforce is attached to the cowl and the upper member of the fender apron, wherein a cowl reinforce bent downwardly is attached to the cowl inner lower side reinforce, wherein the cowl reinforce is attached to the rear reinforcing rail, and wherein the rear reinforcing rail is attached to the upper member of the fender apron and the dash cross member so that a closed section is formed by an upper surface of the rear reinforcing rail, the cowl reinforce, and the cowl inner lower side reinforce, and a closed section is formed on the closed section by the cowl, the cowl inner lower side reinforce, and the upper member of the fender apron.

* * * * *